(12) United States Patent
Liu et al.

(10) Patent No.: US 7,807,258 B2
(45) Date of Patent: Oct. 5, 2010

(54) TOPOLOGICALLY CONTROLLED COMPOSITE STRUCTURE

(75) Inventors: Dahsin Liu, Okemos, MI (US); Peter Schulz, Midland, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 332 days.

(21) Appl. No.: 11/903,523

(22) Filed: Sep. 21, 2007

(65) Prior Publication Data
US 2008/0241443 A1    Oct. 2, 2008

Related U.S. Application Data

(60) Provisional application No. 60/846,429, filed on Sep. 22, 2006.

(51) Int. Cl.
*B32B 1/08*     (2006.01)
*B32B 5/12*     (2006.01)

(52) U.S. Cl. .................................. 428/292.1; 428/34.1

(58) Field of Classification Search ............... 428/292.1
See application file for complete search history.

(56) References Cited

U.S. PATENT DOCUMENTS

| | | | |
|---|---|---|---|
| 5,660,923 A | 8/1997 | Bieler et al. | |
| 5,846,356 A | 12/1998 | Vyakarnam et al. | |
| 5,888,340 A | 3/1999 | Vyakarnam et al. | |
| 6,007,894 A | 12/1999 | Barnes et al. | |
| 6,025,285 A | 2/2000 | Vyakarnam et al. | |
| 6,631,630 B1 | 10/2003 | Pourboghrat et al. | |
| 6,989,197 B2 | 1/2006 | Schneider | |

2005/0236736 A1*   10/2005   Formella et al. ............ 264/258

OTHER PUBLICATIONS

Wardle, Brian L.; "Buckling and Damage Resistance of Transversely-Loaded Composite Shells;" Submitted to the Department of Aeronautics and Astronautics on Apr. 28, 1998 in fulfillment of the requirements for the Degree of Doctor of Philosophy in Aeronautics and Astronautics; Apr. 28, 1998; pp. 2-45 (segment of a book).

Short, G.J. et al.; "Post-Impact Compressive Strenth of Curved GFRP Laminates;" Elsevier Science Ltd., Composites Applied Science and Manufacturing; Part A 33; 2002; pp. 1487-1495.

Shenoi, R.A. et al.; "Through-Thickness Stresses in Curved Composite Laminates and Sandwich Beams;" Elsevier Science Ltd., Composites Science and Technology 61; 2001; pp. 1501-1512.

(Continued)

*Primary Examiner*—D. Lawrence Tarazano
*Assistant Examiner*—Carrie S Thompson
(74) *Attorney, Agent, or Firm*—Harness, Dickey & Pierce, P.L.C.

(57) ABSTRACT

A composite structure is provided. In another aspect of the present invention, a composite structure has relative layer-to-layer fiber orientations of between approximately 5° and 15°, inclusive. A further aspect of the present invention employs relative fiber offset angles less than 30° on a curved section. Yet another aspect of the present invention provides a three-dimensionally woven configuration where the first sheet is interwoven or mechanically linked with both the adjacent second layer and the opposite third or deeper layer.

25 Claims, 6 Drawing Sheets

OTHER PUBLICATIONS

Leylek, Zafer et al.; "Computer Modelling of Impact On Curved Fibre Composite Panels;" Elsevier Science Ltd., Composite Structures 47; 1999; pp. 789-796.

Huang X. G. et al.; "Mechanics of Integral Armor: Discontinuous Ceramic-Cored Sandwich Structure Under Tension and Shear;" Elsevier Science Ltd., Composite Structures 36; 1996; pp. 81-90.

Spottswood, S. Michael et al.; "Progressive Failure Analysis of a Composite Shell;" Elsevier Science Ltd., Composite Structures 53; 2001; pp. 117-131.

Cui, Z. et al.; "Buckling and Large Deformation Behavior of Composite Domes Compressed Between Rigid Platens;" Elsevier Science Ltd., Composite Structures 66; 2004; pp. 591-599.

Zhao, G.P. et al.; "Damage Initiation and Propagation In Composite Shells Subjected to Impact;" Elsevier Science Ltd., Composite Structures; www.elsevier.com/locae/compstruct; 2005; pp. 1-10.

Chun, Lu et al.; "Dynamic Analysis of Clamped Laminated Curved Panels;" Elsevier Science Ltd., Composite Structures 30; 1995; pp. 389-398.

Herszberg, I. et al.; "Impact Damage Resistance of Buckled Carbon/Epoxy Panels;" Elsevier Science Ltd., Composite Structures 73; 2006; pp. 130-137.

Guedes, R.M.; "Stress Analysis of Transverse Loading for Laminated Cylindrical Composite Pipes: An Approximated 2-D Elasticity Solution;" Elsevier Science Ltd., Composites Science and Technology 66; 2006; pp. 427-434.

Krishnamurthy, K.S. et al.; "A Parametric Study of the Impact Response and Damage of Laminated Cylindrical Composite Shells;" Elsevier Science Ltd., Composites Science and Technology 61; 2001; pp. 1655-1669.

Kistler, Laura S. et al.; "On the Response of Curved Laminated Panels Subjected to Transverse Impact Loads;" International Journal of Solids and Structures 36; 1999; pp. 1311-1327.

Kistler, Laura S.; "Experimental Investigation of the Impact Response of Cylindrically Curved Laminated Composite Panels;" American Institute of Aeronautics and Astronautics, Inc.; AIAA-94-1604-CP; 1994; pp. 2292-2297.

Kim, Young-Nam et al.; "Characterization of Impact Damages and Responses in CFRP Composite Shells;" Materials Science Forum, vols. 465-466; 2004; pp. 247-252.

Kim, Y.N. et al.; "Characteristic Evaluation of Impact Responses and Damages in Composite Shell with Various Curvatures;" American Institute of Physics; 2004; pp. 891-897.

Kaczmarek, K. et al.; "Edge Delamination in Curved $(0_4/\pm 45_6)_s$ Glass-Fibre/Epoxy Beams Loaded in Bending;" Elsevier Science Ltd., Composites Science and Technology 58; 1998; pp. 155-161.

Gning, P.B. et al.; "Prediction of Damage in Composite Cylinders After Impact;" Journal of Composite Materials, vol. 39, No. 10; 2005; pp. 917-928.

Ambur, Damodar R. et al.; "Scaling the Non-Linear Impact Response of Flat and Curved Composite Panels;" American Institute of Aeronautics and Astronautics; Presented at the 46th AIAA/ASME/ASCE/AHS/ASC Structures, Structural Dyanmics, and Materials Conference; AIAA Paper No. 2005-2224; Apr. 18-21, 2005; pp. 1-12.

Ambur, Damodar et al.; "Effect of Curvature on the Impact Damage Characteristics and Residual Strength of Composite Plates;" Presented at the 39th AIAA/ASME/ASCE/AHS/ASC Structures, Structural Dyanmics, and Materials Conference; AIAA Paper No. 98-1881; Apr. 20-23, 1998; pp. 1-11.

DSM Dyneema B.V.; "DSM Applications;" http://www.dsm.com/en_US/html/hpf/applications.htm; Sep. 18, 2006; 2 pages.

DSM Dyneema B.V.; "DSM Textiles;" http://www.dsm.com/en_US/html/hpf/applications_textiles.htm; Sep. 18, 2006; 1 page.

DSM Dyneema B.V.; "DSM Helmets;" http://www.dsm.com/en_US/html/hpf/applications_helmets.htm; Sep. 18, 2006; 1 page.

DSM Dyneema B.V.; "DSM Vests;" http://www.dsm.com/en_US/html/hpf/applications_vests.htm; Sep. 18, 2006; 1 page.

DSM Dyneema B.V.; "DSM Inserts;" http://www.dsm.com/en_US/html/hpf/applications_inserts.htm; Sep. 18, 2006; 1 page.

DSM Dyneema B.V.; "DSM Vehicle Armor Panels;" http://www.dsm.com/en_US/html/hpf/applications_vehicle_armor_panels.htm; Sep. 18, 2006; 1 page.

DSM Dyneema B.V.; "DSM Dyneema® UD;" http://www.dsm.com/en_US/html/hpf/dyneema_ud.htm; Sep. 18, 2006; 2 pages.

* cited by examiner

TOPOLOGICALLY CONTROLLED COMPOSITE STRUCTURE

CROSS-REFERENCE TO RELATED APPLICATIONS

This application claims the benefit of U.S. Provisional Ser. No. 60/846,429, filed Sep. 22, 2006, which is incorporated by reference herein.

GOVERNMENT FUNDING

The present invention was funded under U.S. Army TARDEC Contract No. DAAE07-00-C-L075. The U.S. government may have certain rights to this invention.

BACKGROUND

This invention relates generally to composites and more particularly to a composite structure having a specific fiber or shape configuration.

It is known to employ prepreg composites with stacked material layers. Each layer typically has resin and fibers, with the fibers being oriented at 45°/0°/−45°/90°, 30°/90°/0°/90° or 30°/60°/90°/0° for relative adjacent layers. For example, traditional constructions are disclosed in Ambur et al., "Effect of Curvature on the Impact Damage Characteristics and Residual Strength of Composite Plates," American Institute of Aeronautics and Astronautics, AIAA 98-1881 (Apr. 20-23, 1998); Z. Cui et al., "Buckling and Large Deformation Behaviour of Composite Domes Compressed Between Rigid Platens," Composite Structures 66 (2004), pp. 591-599 (Elsevier); and S. Spottswood et al., "Progressive Failure Analysis of a Composite Shell," Composite Structures 53 (2001), pp. 117-131 (Elsevier). Such conventional fiber patterns, however, are prone to severe delamination, cracking and fiber breakage upon projectile impact.

SUMMARY

In accordance with the present invention, a composite structure is provided. In another aspect of the present invention, a composite structure has relative layer-to-layer fiber orientations of between approximately 5° and 15°, inclusive. A further aspect of the present invention employs relative fiber offset angles less than 30° on a curved section. Yet another aspect of the present invention provides a three-dimensionally woven configuration where the first sheet is interwoven or mechanically linked with both the adjacent second layer and the opposite third or deeper layer. A method of making a composite structure is also provided.

The composite structure of the present invention is advantageous over traditional constructions in that the present invention allows for fiber bridging spanning the curved shape, generally without significant delamination, upon projectile impact. This allows for up to 90% energy absorption of the impact without significant structural composite failure. The present invention is thereby ideally suited for use in armor plating without the conventional weight of metallic materials and with the ease of forming curved yet thin shapes. Additional advantages and features of the present invention will become apparent from the following description, taken in conjunction with the accompanying drawings.

DETAILED DESCRIPTION OF THE PREFERRED EMBODIMENTS

Figure 1:
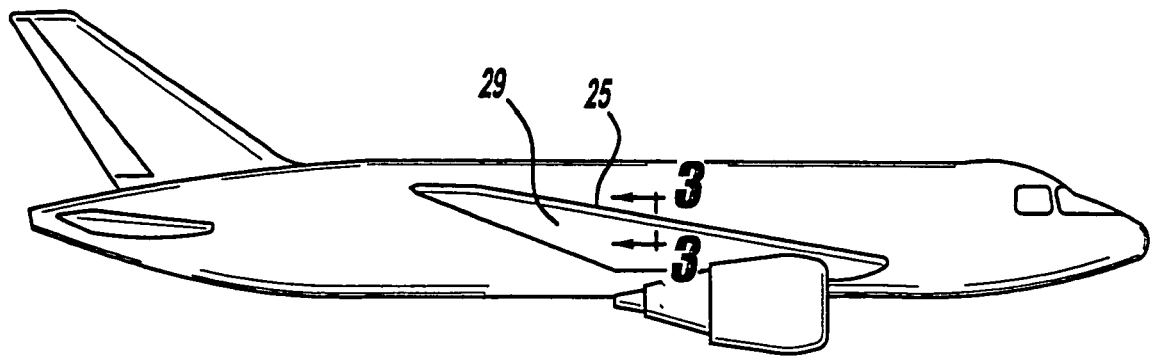
FIG. 1 is a side elevational view showing the composite structure of the present invention employed on an airplane.
Figure 3:
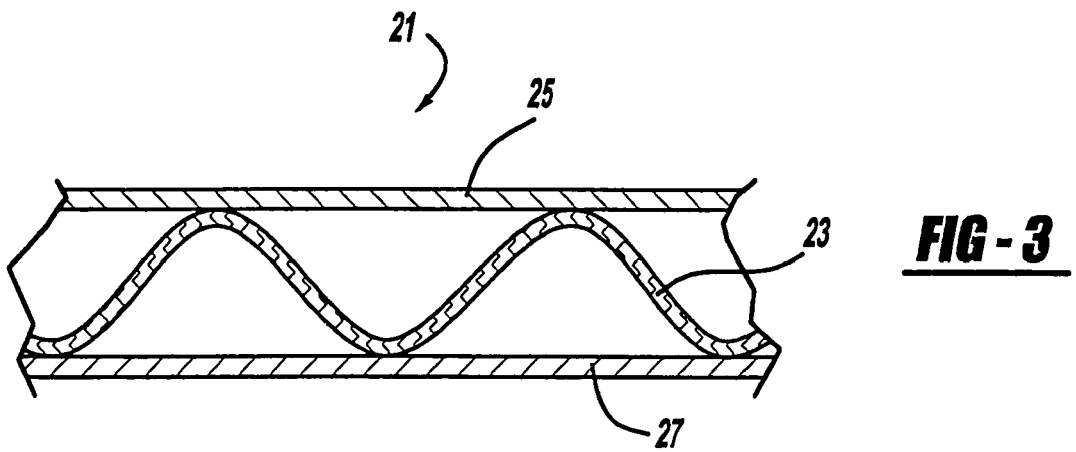
FIG. 3 is a cross-sectional view, taken along line 3-3 of FIG. 1, showing a first preferred embodiment of the composite structure.

A first preferred embodiment topologically controlled composite structure 21 of the present invention is shown in FIGS. 1 and 3. Composite structure 21 includes multiple curved composite layers 23, outer skin composite layers 25 and inner skin composite layers 27, all permanently joined together. Curved composite layers 23 have a repeating corrugated shape. Skin layers 25 and 27 span between and bridge the corrugations such that the skins only contact tangents, in other words the peaks and valleys, of curved composite layers 23. Outer skin layers 25 act as an aerodynamic surface on an aerospace craft or vehicle such as a leading edge of an airplane wing 29, the underside of a helicopter, or an outer shield for a satellite; alternately outer skin layers 25 can be used as an outer surface of a ship hull, other marine vehicle, or the like.

Figure 2:
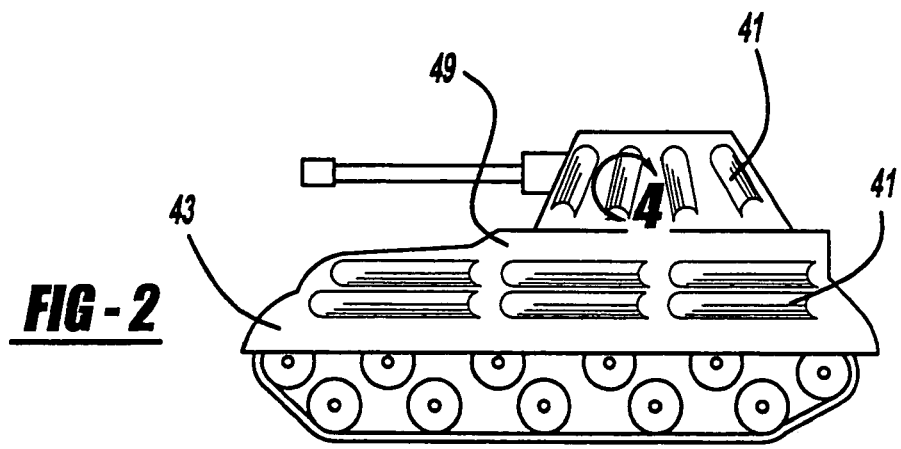
FIG. 2 is a side elevational view showing the composite structure of the present invention employed on a military tank.
Figure 4:
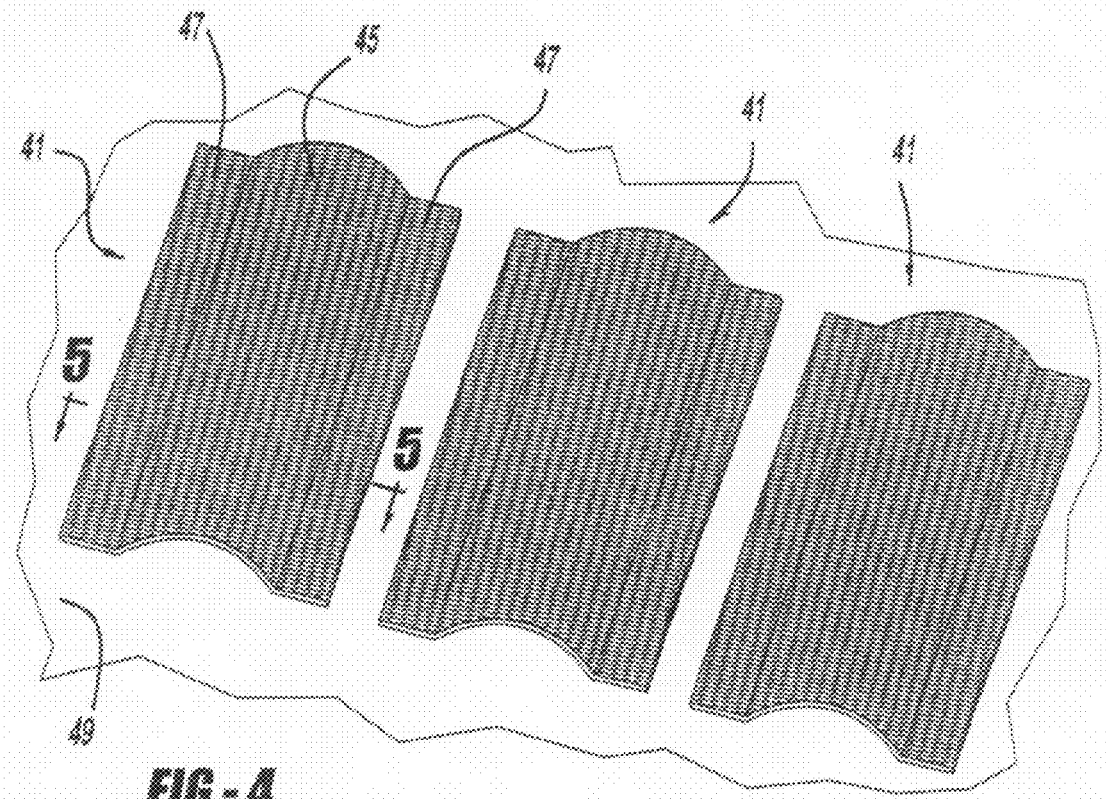
FIG. 4 is a fragmentary and perspective view, taken from FIG. 2, showing a second preferred embodiment of the composite structure.
Figure 5:
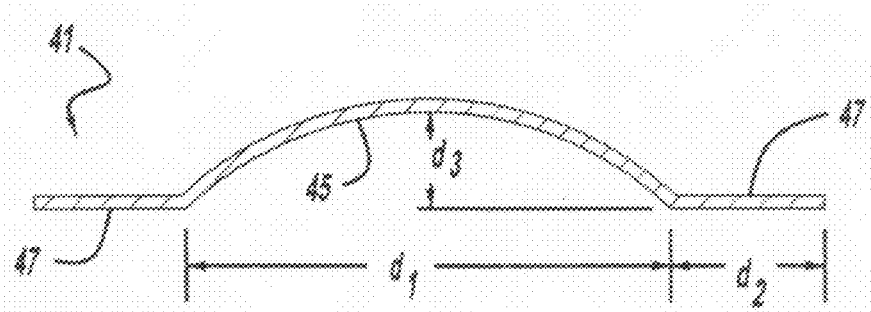
FIG. 5 is a cross-sectional view, taken along lines 5-5 of FIG. 4, showing the second preferred embodiment composite structure.

A second preferred embodiment composite structure 41 is employed as armor on a land vehicle such as a military tank 43, personnel carrier or automobile. This is shown in FIGS. 2, 4 and 5. Each composite structure 41 has a curved middle segment 45 bordered by flanges 47 which are attached to an underlying skin 49. Skin 49 can be made from a composite, steel or other material. Middle segment 45 has a generally semi-cylindrically curved shape. Referring to FIG. 5, exemplary dimensions for composite structure 41 are as follows: $d_1$ is approximately 3.0 inches, $d_2$ is approximately 1.0 inches and $d_3$ is approximately 0.3-0.8 inches. It should be appreciated, however, that these dimensions may vary depending upon the actual aerospace, land vehicle or watercraft application.

Figure 6:
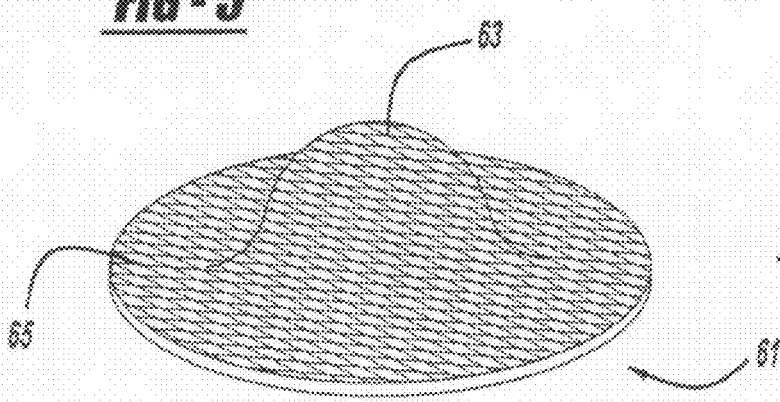
FIG. 6 is a perspective view showing a third preferred embodiment of the composite structure.

A third preferred embodiment composite structure 61 of the present invention can be observed in FIG. 6. A curved segment 63 has a generally semi-spherical curved shape or dome shape projecting from a generally planar base segment 65. It should be appreciated that inner and outer skins such as those shown in FIG. 3 may also be employed with any of these preferred embodiments disclosed herein depending upon whether aerodynamic or aesthetic covering of the curved shape is desired.

Figure 7:
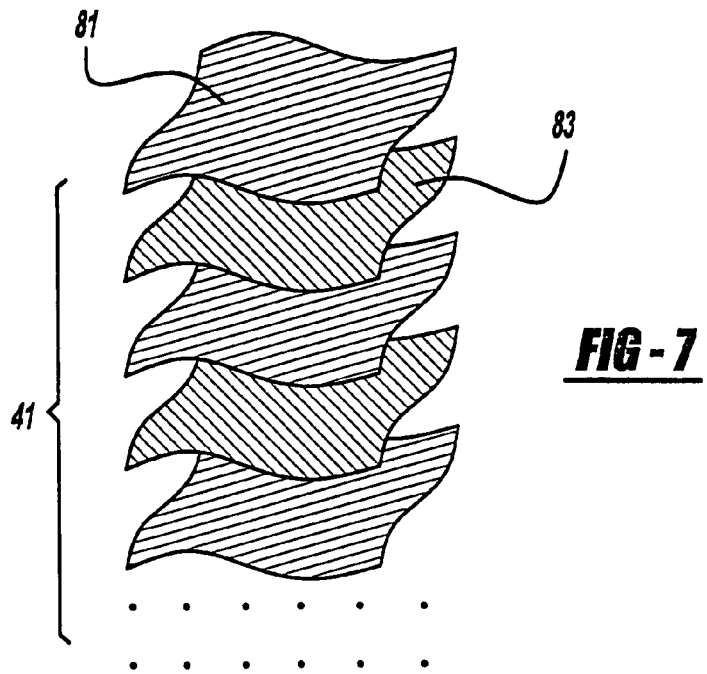
FIG. 7 is an exploded and diagrammatic, perspective view showing the preferred embodiments of the composite structure prior to shaping.
Figure 8:
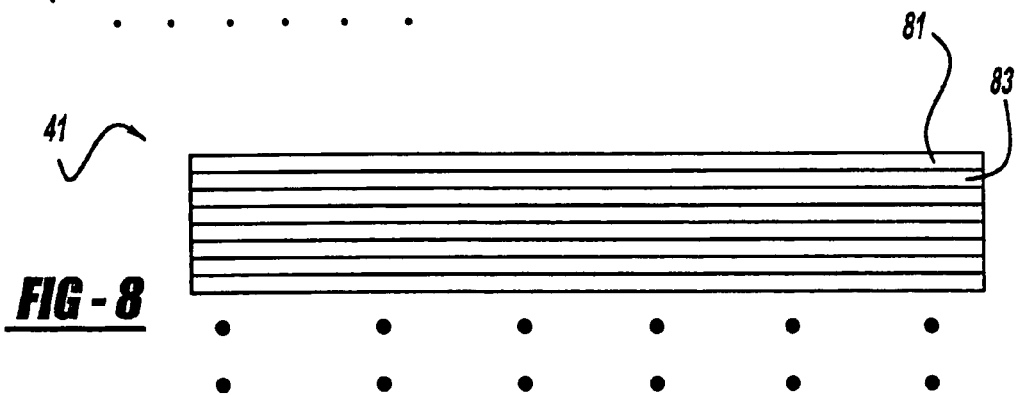
FIG. 8 is a diagrammatic side view showing the preferred embodiments of the composite structure prior to shaping.
Figure 10:
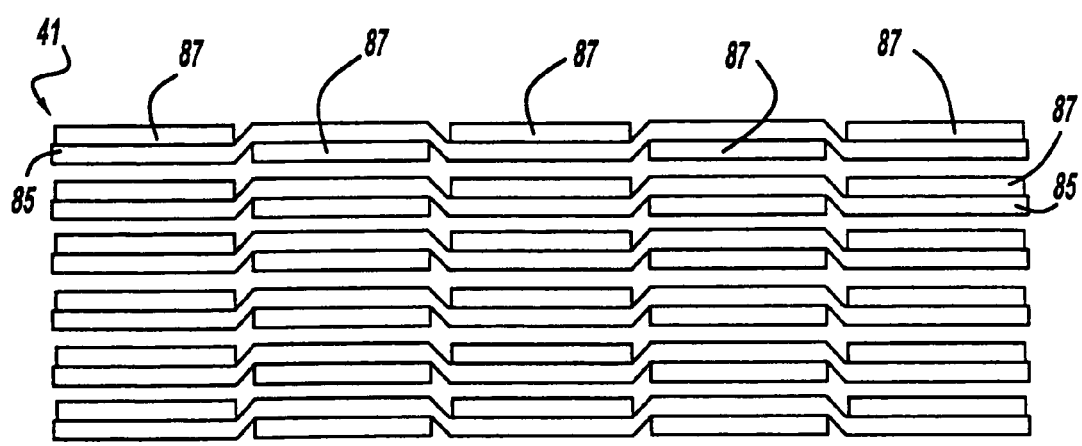
FIG. 10 is a diagrammatic side view showing a weaving pattern of the preferred embodiments of the composite structure, employing a two-dimensional fabric weave, prior to shaping.
Figure 9:
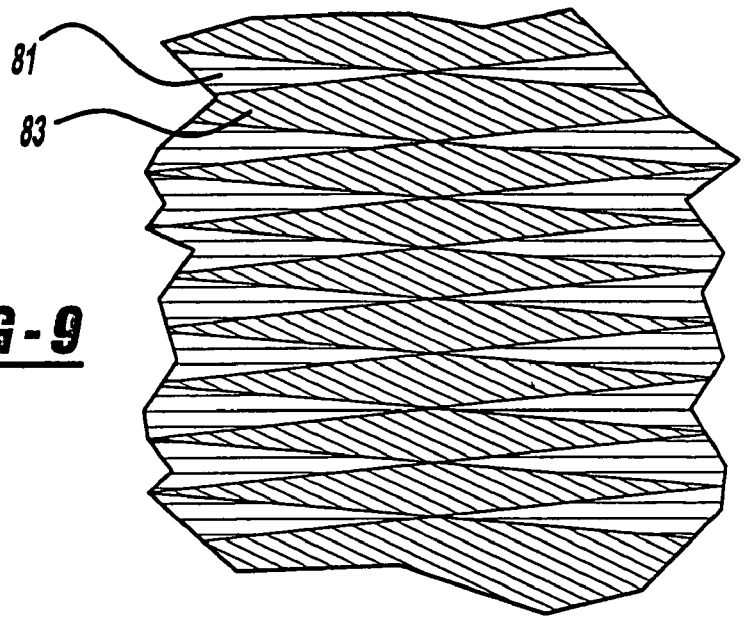
FIG. 9 is an exaggerated and diagrammatic top view showing the preferred embodiments of the composite structure, employing a two-dimensional fabric weave, prior to shaping.

All of the presently disclosed preferred embodiment composite structures are made by: (1) stacking and overlapping sheets or layers made of fibers and resin as shown in FIGS. 7 and 8; or (2) a "two-dimensional" weave between two adjacent fiber bundles, with each woven layer or ply then being stacked upon each other in an overlapping manner with resin applied before or after the weaving to join the fabric layers, such as is shown in FIG. 10. With either approach, the adjacent layer-to-layer fiber orientation is approximately 0° and the immediately adjacent fiber orientation is between 5° and 29°, inclusive, and more preferably about 0° and between 5°-15°, inclusive. It should be appreciated that the desired fiber orientation is the primary or average fiber orientation as the fibers may not be perfectly straight and may have a slight tolerance variation during manufacturing. Furthermore, the 0° orientation is simply a base reference angle from which the adjacent layer orientation is measured. This fiber orientation is shown in an exaggerated fashion in FIGS. 7 and 9 wherein a first layer 81 has a reference orientation of 0° and the immediately adjacent layer 83 has a relative reference fiber orientation of 5°. Similarly, in the woven scenario of FIG. 10, a warp fiber 85 has a reference orientation of 0° while a woven and interlinking weft fiber 87 has a reference orientation of about 5°.

Figure 11:
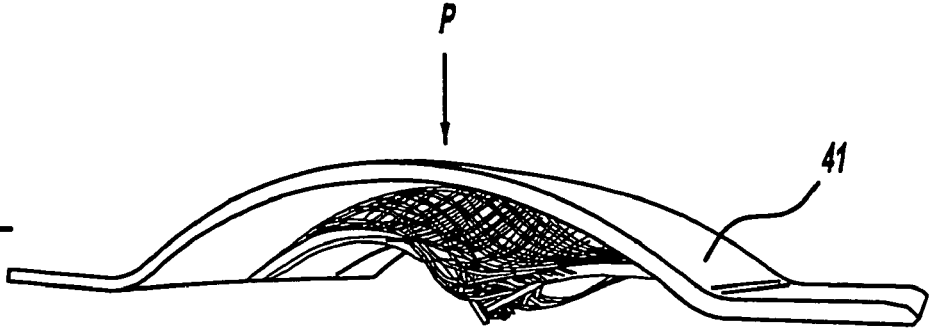
FIG. 11 is a perspective view showing the second preferred embodiment composite structure after a projectile impact.

FIG. 11 illustrates composite structure 41 after the curved segment is impacted by a bullet-type projectile P. In this scenario, the fibers tear out of the resin matrix and bridge across the back, concave side of the curved segment without significant layer-to-layer delamination. Improved results are expected for larger radii or a greater curved height dimension $d_3$. The combination of small fiber angle offsets between immediately adjacent layers and the curved shape provides significant energy absorption without complete composite structure failure.

The laminated version of the present invention can be made from a prepreg tape or fabric, or a fiber preform. Glass fibers, fabrics and braided preforms are preferred for land vehicles and marine structures due to their high specific strength properties. Polymeric fibers, fabrics and braided preforms, such as Kevlar® aramid, Spectra® polyethylene or Dyneema® polyethylene, are preferred for military applications due to their high specific energy absorption characteristics. Furthermore, carbon fibers, fabrics and braided preforms are preferred for aerospace vehicles due to their high specific stiffness properties. Toughened epoxy resins are desirable in the specific curing temperatures is dependent on the type of epoxy resin used. For example, if manufacturing convenience is of primary concern, then a low temperature and low viscosity epoxy resin should be employed. If the structure is to be used in high temperature environments, however, a high temperature epoxy would be desirable.

The following preferred manufacturing steps are employed with the laminated versions of the preferred embodiment composite structures. First, the fiber preform is prepared by selecting laminated fabrics or sheets with small relative offset angles between adjacent layers or two-dimensional fabrics with small angle differences between warp and weft yarns, or three-dimensional fabrics with small angular differences between linked layers. Second, a clean mold with the designated curved geometry is made. Third, the mold is waxed, and fourth, a sealant tape is applied around a perimeter of the mold. Fifth, the operator cuts a peel ply and places it on the mold surface. Sixth, the operator places the fiber preform over the peel ply and marks its outline on the peel ply before removing it from the mold. Seventh, the user prepares the epoxy matrix by mixing a hardener and the resin into the designated ratio. Furthermore, eighth, the user applies the mixed epoxy to the peel ply on the marked area for the fiber preform. Ninth, the user places the fiber preform on the epoxy and tenth, adds a second layer of peel ply over the fiber preform. Eleventh, the user adds a bleeder/breather fabric on the top of the second peel ply. Twelfth, a vacuum bag is applied to the sealant tape on the mold and thirteenth, a vacuum gauge is inserted at one end of the mold. Fourteenth, the user sets up the vacuum pump and piping, and fifteenth, turns on the pump to impregnate the fiber preform with the epoxy matrix and cures the epoxy. Sixteenth, the composite structure is trimmed and seventeenth, the user inspects the composite structure for design compliance. Eighteenth, the composite component is applied to a secondary assembly with adhesive bonding and nineteenth, the operator conducts a final assembly inspection. Finally, the composite structure assembly is packaged and shipped.

Figure 12:
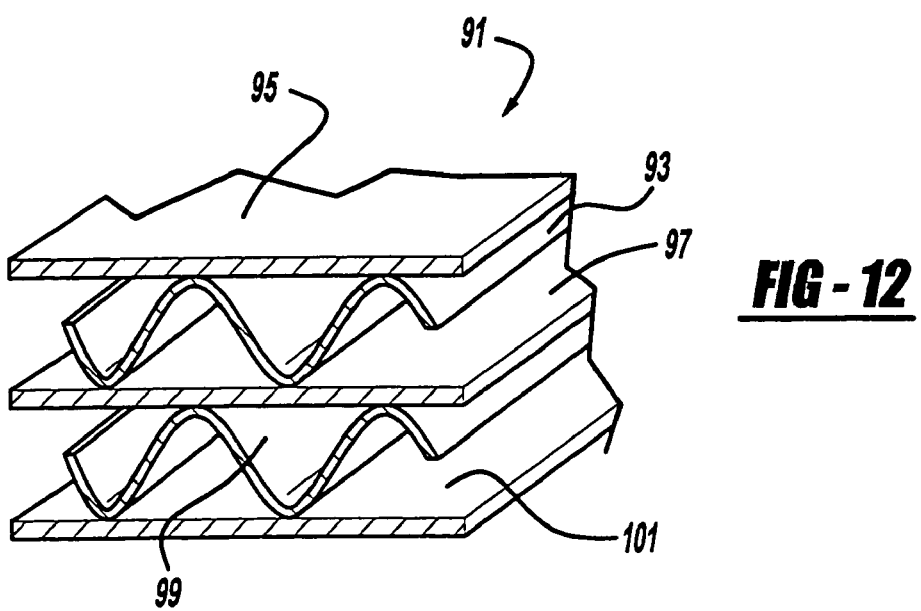
FIG. 12 is a fragmentary perspective view showing a first alternate embodiment of the composite structure.

FIG. 12 illustrates an alternate embodiment composite structure 91. In this embodiment, a corrugated curved shape segment 93, including multiple joined fiber and resin sheets, is attached between outer composite skin layers 95 and middle composite skin layers 97. Additionally, a second corrugated curved composite segment 99, having peaks and valleys offset from the first corrugated segment 93, is affixed between middle skin layers 97 and inner composite skin layers 101. The skin layers bridge and span between the peaks and valleys of each corrugation segment, essentially only contacting the corrugated segments at the tangents of their respective curves.

Figure 13:
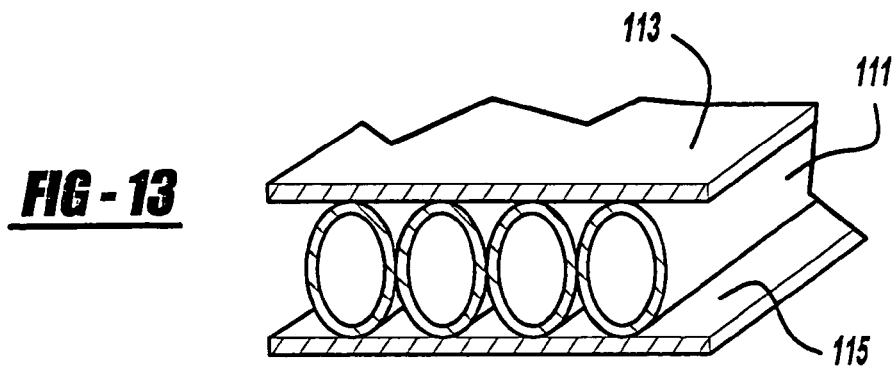
FIG. 13 is a fragmentary perspective view showing a second alternate embodiment of the composite structure.
Figure 14:
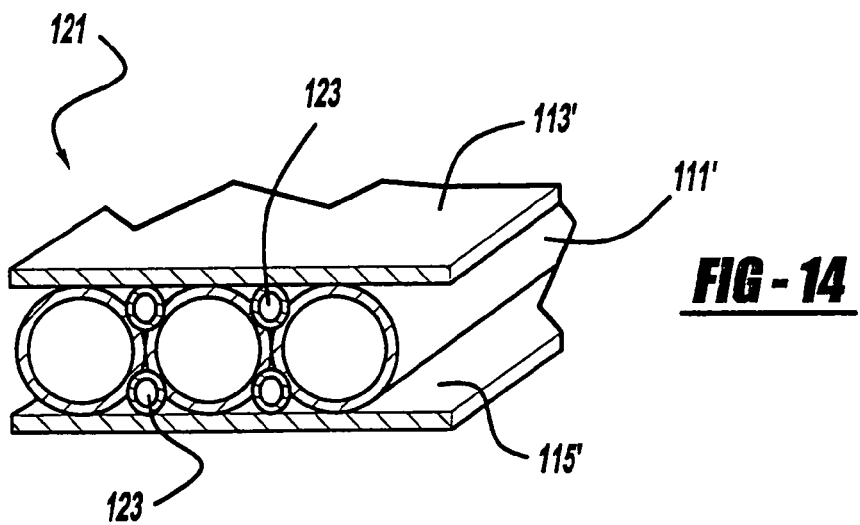
FIG. 14 is a fragmentary perspective view showing a third alternate embodiment of the composite structure.

FIG. 13 discloses a series of elongated, tube-like curved composite segments 111 affixed between spanning composite outer and inner skins 113 and 115, respectively. Tubular segments 111 each have a generally cylindrical shape. Each of the composite segments and skins includes multiple sheets of fiber and resin layers. The tubular segments 111 only contact each other along outer tangents and only contact the bridging skins at their corresponding tangents thereby leaving somewhat triangular gaps defined by adjacent pairs of tubular segments 111 and the adjacent skin 113 or 115. The inside of each tubular segment 111 is also open or hollow. The tubular segments 111 are further generally parallel to each other. Referring to FIG. 14, another alternate composite structure 121 is similar to that shown in FIG. 13, however, a smaller elongated and tubular curved segment 123 is located in each of the gaps between the much larger diameter tubular segments 111' and the adjacent skins 113' or 115'. The smaller diameter tubular segments 123 are also of a multi-layer fiber and resin composite structure. This exemplary embodiment creates a hollow and multi-cellular curved configuration.

Figure 15:
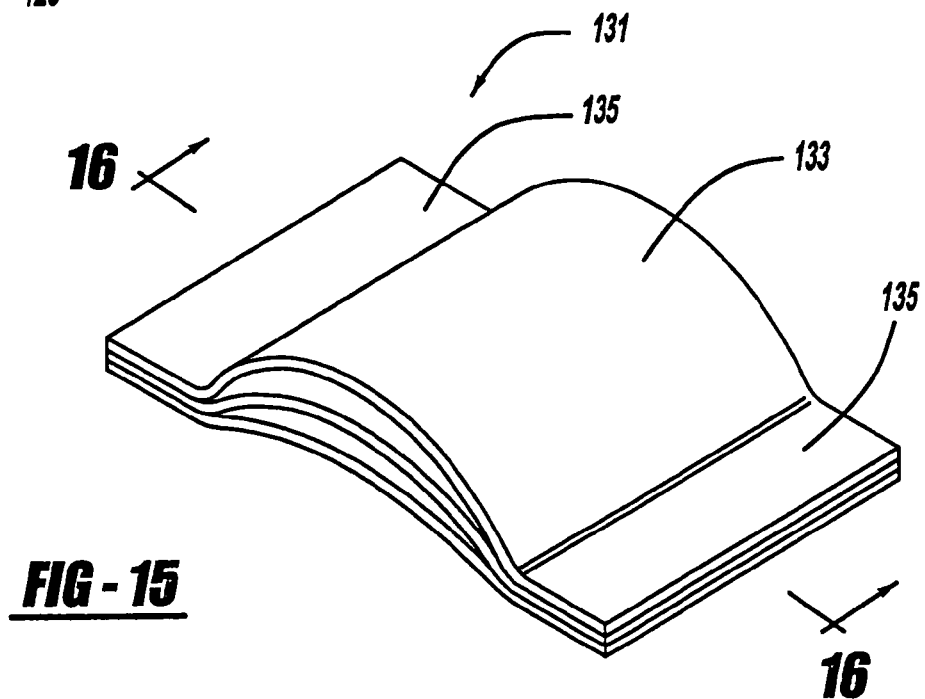
FIG. 15 is a perspective view showing a fourth alternate embodiment of the composite structure.
Figure 16:
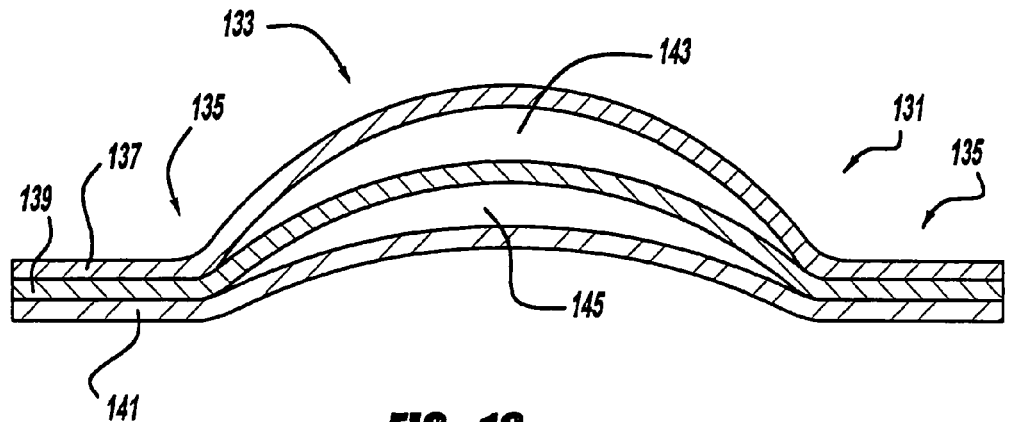
FIG. 16 is a cross-sectional view, taken along line 16-16 of FIG. 15, showing the fourth alternate embodiment composite structure.

Moreover, referring to FIGS. 15 and 16, another alternate embodiment composite structure 131 has a central curved segment 133 and a pair of outboard flanges 135. Three or more fiber and resin layers 137, 139 and 141 are joined together in an overlapping and contacting manner at flanges 135, however, these layers are spaced away from each other and have air gaps 143 and 145 therebetween at the curved segment 133. It should also be appreciated that each layer 137, 139 and 141 may include multiple laminated or woven sheets therein.

Figure 17:
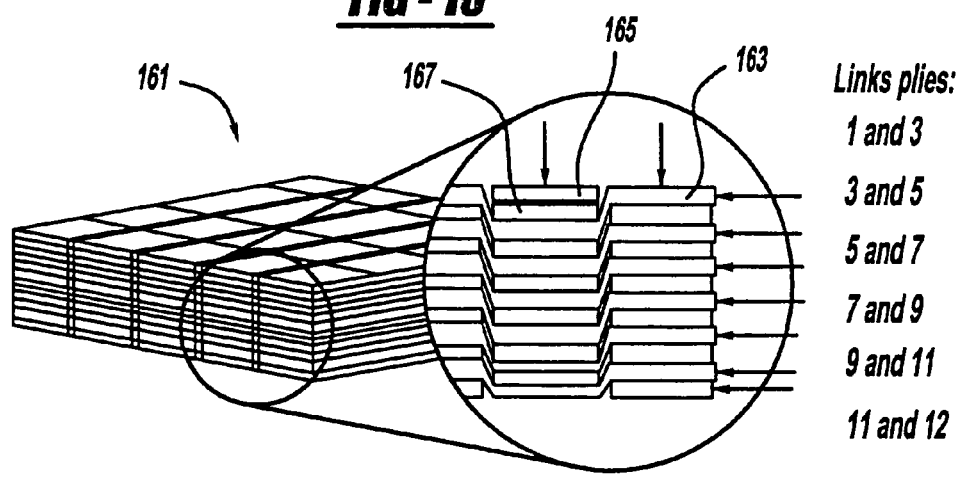
FIG. 17 is a diagrammatic perspective view showing a first alternate embodiment of a weaving pattern employed with the composite structure.
Figure 18:
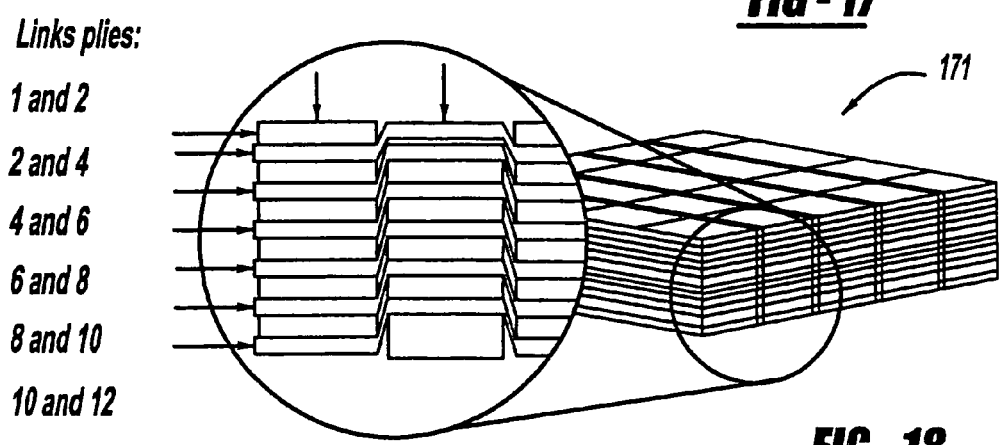
FIG. 18 is a diagrammatic perspective view showing a second alternate embodiment of a weaving pattern employed with the composite structure.

FIGS. 17 and 18 illustrate alternate embodiments of "three-dimensionally" woven composite structures 161 and 171. With the embodiment of FIG. 17, a first warp fiber 163 is woven around first and second weft fibers 165 and 167 in a repeating manner. Thus, a first ply is woven with a third ply, a third ply is woven with a fifth ply, a fifth ply is woven with a seventh ply, a seventh ply is woven with a ninth ply, a ninth ply is woven with an eleventh ply, and the eleventh ply is woven with a twelfth ply. With the embodiment of FIG. 18, a first ply is woven with a second ply, a second ply is woven with a fourth ply, a fourth ply is woven with a sixth ply, a sixth ply is woven with an eighth ply, an eighth ply is woven with a tenth ply and a tenth ply is woven with a twelfth ply. Accordingly, there is no need for a separate transverse stitch to sew together multiple ply layers as the present invention integrally links multiple depth plies together during the initial weaving process. These composite structures 161 and 171 also contain an epoxy or other polymeric resin. These three-dimensionally woven composite structures 161 and 171 are preferably employed with small angular offsets between adjacent ply layers and within a curved segment after shaping and curing, however, they do not necessarily need to have small fiber angle offsets and curved final shapes if they are employed in other non-impact final use applications.

While various aspects of the present invention have been disclosed, it should be appreciated that other variations may fall within the scope of the present invention. For example, a single very large dome-shaped composite structure can be employed on the side of an armored land vehicle with multiple underlying smaller dome, corrugated or tubular curved composite structures thereunder. It should also be appreciated that various numbers of composite layers have been shown by way of example, but a greater or lesser number of composite layers may actually be employed depending upon the end use applications and specific materials chosen. It is intended by the following claims to cover these and any other departures from the disclosed embodiment which falls within the true spirit of this invention.

The invention claimed is:

1. A composite structure comprising:
a first fiber composite layer having a relative fiber direction of about 0°;
at least a second fiber composite layer having a relative fiber direction of between about 5° and 15°, inclusive, compared to the first composite layer;
the layers being secured together adjacent each other in an overlapping manner;
at least a section of the composite layers having a curved shape when cured; and
a third skin composite layer attached to only a tangent of the curved shape of at least one of the first and second composite layers.

2. The composite structure of claim 1 further comprising a fourth skin composite layer attached to an opposite portion of at least one of the first and second composite layers, the third and fourth composite layers being substantially parallel and spaced apart from each other while bridging between multiple peaks or valleys of multiples of the curved shape section.

3. A composite structure comprising:
a first fiber composite layer having a relative fiber direction of about 0°; and
at least a second fiber composite layer having a relative fiber direction of between about 5° and 15°, inclusive, compared to the first composite layer;
the layers being secured together adjacent each other in an overlapping manner;
at least a section of the composite layers having a curved shape when cured;
wherein the curved shape is a dome.

4. A composite structure comprising:
a first fiber composite layer having a relative fiber direction of about 0°; and
at least a second fiber composite layer having a relative fiber direction of between about 5° and 15°, inclusive, compared to the first composite layer;
the layers being secured together adjacent each other in an overlapping manner;
at least a section of the composite layers having a curved shape when cured;
wherein the curved shape is substantially cylindrical.

5. The composite structure of claim 4 further comprising a third skin composite layer attached to only a tangent of the curved shape of at least one of the first and second composite layers.

6. The composite structure of claim 4 wherein the composite layers provide aircraft armor operable to substantially stop complete bullet-like projectile perforation.

7. The composite structure of claim 4 wherein the composite layers provide land vehicle armor operable to substantially stop complete bullet-like projectile perforation.

8. A composite structure comprising:
a first fiber composite layer having a relative fiber direction of about 0°; and
at least a second fiber composite layer having a relative fiber direction of between about 5° and 15°, inclusive, compared to the first composite layer;
the layers being secured together adjacent each other in an overlapping manner;
at least a section of the composite layers having a curved shape when cured;
wherein fiber bridging spans the curved shape during projectile impact substantially without delamination of the composite layers.

9. A composite structure comprising:
a first fiber composite layer having a relative fiber direction of about 0°; and
at least a second fiber composite layer having a relative fiber direction of between about 5° and 15°, inclusive, compared to the first composite layer;
the layers being secured together adjacent each other in an overlapping manner;
at least a section of the composite layers having a curved shape when cured;
wherein the fibers are three-dimensionally woven and interlinking between the composite layers.

10. A composite structure comprising:
a first fiber composite layer;
a second fiber composite layer;
at least a third fiber composite layer; and
resin secured to at least one of the composite layers;
the layers being three-dimensionally woven together with fibers from the first composite layer being mechanically linked to fibers from the at least third or deeper composite layer, and fibers from the first composite layer being mechanically linked to fibers from the second layer.

11. The composite structure of claim 10 wherein the composite layers comprise at least a section that is curved.

12. The composite structure of claim 11 wherein fiber bridging spans the curved section during projectile impact substantially without delamination of the composite layers.

13. The composite structure of claim 11 further comprising a fourth skin composite layer attached to only a tangent of the curved section.

14. The composite structure of claim 10 wherein the composite layers define a cylindrical shape.

15. The composite structure of claim 10 wherein the composite layers define a substantially semi-spherical shape.

16. The composite structure of claim 10 wherein the composite layers define a repeating corrugated shape.

17. The composite structure of claim 10 wherein the composite layers provide aircraft armor operable to substantially stop complete bullet-like projectile perforation.

18. The composite structure of claim 10 wherein the composite layers provide land vehicle armor operable to substantially stop complete bullet-like projectile perforation.

19. The composite structure of claim 10 wherein fibers in one of the composite layers are oriented at or between 5° and 15° relative to the adjacent composite layer.

20. A composite structure comprising:
   a first tubular member;
   a second tubular member of substantially the same cross sectional size as the first tubular member;
   a third tubular member having a smaller cross sectional size compared to the first tubular member; and
   a member attached to tangents of the tubular members, the first and second tubular members having tangents contacting each other;
   wherein each of the tubular members includes at least two composite sheets with offset angled fibers from one sheet relative to the adjacent sheet.

21. The composite structure of claim 20 further comprising a second substantially flat member attached to opposite portions of the first and second tubular members substantially parallel to the first flat member.

22. The composite structure of claim 20 wherein the flat member includes at least two composite prepreg sheets with offset angled fibers from one sheet relative to the adjacent sheet.

23. The composite structure of claim 20 wherein the sheets are prepreg sheets which provide land vehicle armor.

24. The composite structure of claim 20 wherein fiber bridging spans each of the first and second tubular members during projectile impact thereof substantially without delamination of the associated sheets.

25. A method of making a composite structure, the method comprising:
   (a) locating a first sheet oriented with a first fiber direction;
   (b) locating a second sheet overlapping the first sheet, oriented with a second fiber direction offset from the first fiber direction by about 5°-15°, inclusive;
   (c) applying a vacuum to the sheets;
   (d) curving at least a portion of the sheets; and
   (e) curing resin in the sheets so that the sheets are bonded together, the curved portion remaining curved after the curing.

* * * * *

UNITED STATES PATENT AND TRADEMARK OFFICE
CERTIFICATE OF CORRECTION

| | |
|---|---|
| PATENT NO. | : 7,807,258 B2 |
| APPLICATION NO. | : 11/903523 |
| DATED | : October 5, 2010 |
| INVENTOR(S) | : Dahsin Liu and Peter Schulz |

It is certified that error appears in the above-identified patent and that said Letters Patent is hereby corrected as shown below:

In the Specification:

GOVERNMENT FUNDING

Column 1, Line 13, delete "The present invention was funded under U.S. Army TARDEC Contract No. DAAE07-00-C-L075. The U.S. government may have certain rights to this invention." and insert therefor:

--This invention was made with government support under DAAE07-00-C-L075. The government has certain rights in the invention.--

Signed and Sealed this
Tenth Day of November, 2015

Michelle K. Lee
*Director of the United States Patent and Trademark Office*